(No Model.)

G. H. GERE.
CLUTCH.

No. 551,760.　　　　Patented Dec. 24, 1895.

Witnesses
Lewis E. Flanders
Lotta C. Buck

Inventor
George H. Gere
By Attorney
Luther V. Moulton

UNITED STATES PATENT OFFICE.

GEORGE H. GERE, OF GRAND RAPIDS, MICHIGAN.

CLUTCH.

SPECIFICATION forming part of Letters Patent No. 551,760, dated December 24, 1895.

Application filed December 12, 1894. Serial No. 531,603. (No model.)

*To all whom it may concern:*

Be it known that I, GEORGE H. GERE, a citizen of the United States, residing at Grand Rapids, in the county of Kent and State of Michigan, have invented certain new and useful Improvements in Clutches; and I do hereby declare the following to be a full, clear, and exact description of the invention, such as will enable others skilled in the art to which it appertains to make and use the same.

My invention relates to improvements in clutches, and its object is to provide the same with certain new and useful features, hereinafter more fully described, and particularly pointed out in the claims, reference being had to the accompanying drawings, in which—

Figure 1:
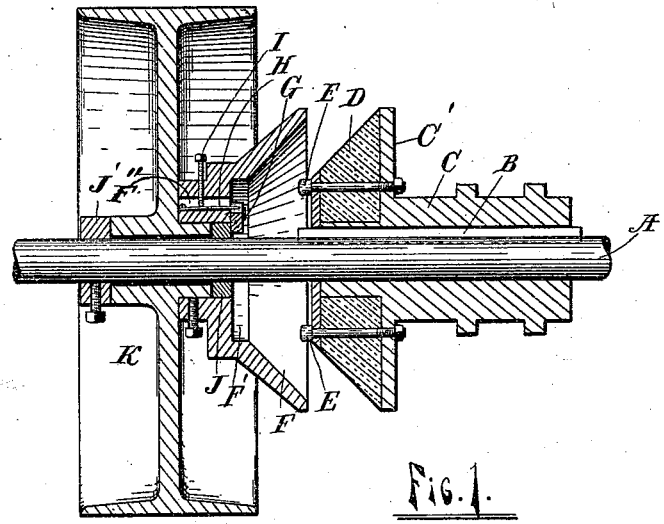
Figure 2:
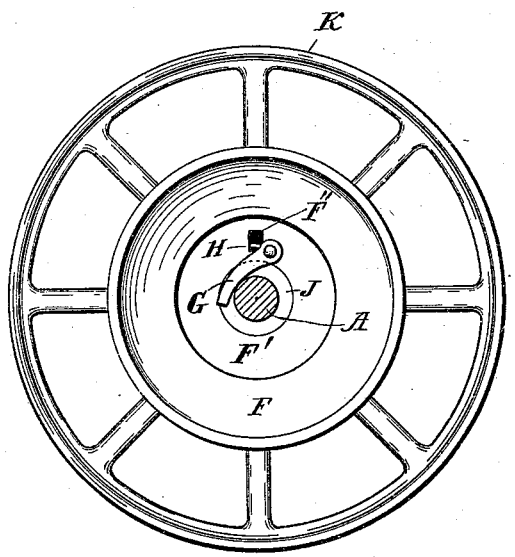
Figure 3:
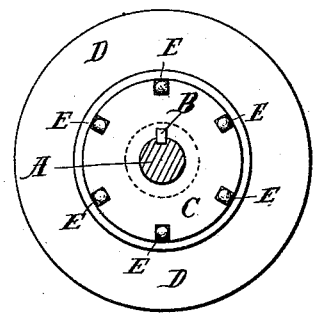

Figure 1 is a longitudinal axial section of a device embodying my invention. Fig. 2 is a detail showing the driven portion of the same, and Fig. 3 is a detail showing the driving portion of the same.

Like letters refer to like parts in all of the figures.

A is a shaft on which is the longitudinal movable sleeve C, driven by means of the spline B. The inner end of said sleeve is provided with a flange C', forming a seat for the driving member D of a friction-clutch, which is preferably made of paper in the form of a truncated cone and secured to the flange C' by bolts having square heads E, which heads project beyond the inner end of said friction-cone and serve as a ratchet for engaging the pawl G.

F is the driven member of the friction-clutch, having a funnel-shaped surface to engage the cone D and secured to the hub of the loose pulley K. F' is a suitable chamber in the member F to receive the bolt-heads E and within which is pivoted the centrifugal pawl G, which pawl is forced toward the shaft A by the spring H. A chamber is provided in the hub of said member F, in which said spring is secured, and an adjusting-screw I, passing through the outer portion of said hub to said chamber, engages said spring to adjust the tension thereof.

J and J' are collars secured to the shaft A to prevent any longitudinal motion of the pulley K.

When the driving member D of the cone-friction is moved toward the driven member F, the friction-surfaces of said members come in contact, and as the member D is revolving with the shaft, motion is transmitted to the member F and loose pulley K. As the speed of said driven member and pulley increases, centrifugal force will throw the pawl G outward and said pawl will engage with one of the bolt-heads E on the inner end of the member D.

By this construction I combine the advantages of a pawl and ratchet clutch with those of a friction-clutch.

In the ordinary friction-clutch much pressure is required to keep sufficient contact between the friction-surfaces to prevent slipping, and the ordinary pawl and ratchet clutch is a positive connection, and therefore the pulley must start suddenly when the connection is made. In the construction shown the pulley is started by friction and the positive connection made afterward. The pressure between the friction-surfaces can be relieved and the pawl will continue to positively drive the loose pulley. By sufficiently separating the members of the clutch the pawl will be laterally disengaged from the bolt-head and the driven parts released.

What I claim is—

1. A clutch comprising frictionally-operated clutch members, and centrifugally-operated positive clutch members, substantially as described.

2. In a clutch, in combination with the driving and driven members of a friction clutch, a centrifugally operated pawl pivoted to one member of said friction clutch, and projections on the opposite member of said friction clutch to engage said pawl, substantially as described.

3. In combination, a shaft, the driving member of a friction clutch movable on said shaft, the driven member of said clutch adapted to engage said driving member, a centrifugal pawl pivoted to said driven member, a spring engaging said pawl, means for adjusting said spring, and projections upon said driving member adapted to be engaged by said pawl, substantially as described.

4. In combination, a shaft, a sleeve splined upon said shaft, a truncated cone friction, one member secured to said sleeve, a funnel shaped friction member loosely journaled on said shaft, and a centrifugally operated pawl pivoted to said loosely journaled member and adapted to engage projections on said splined member, substantially as described.

5. In combination with a cone friction, a centrifugal pawl pivoted to the driven member of said friction, a spring adapted to engage said pawl, an adjusting screw to engage said spring, and a series of bolt heads on the driving member of said friction and engaged by said pawl, whereby a positive connection is secured between said members after reaching a certain speed, substantially as described.

6. In combination, a shaft, a pulley loosely mounted upon said shaft, collars secured to said shaft at opposite sides of said pulley, the driven member of a friction clutch secured to the hub of said pulley, a centrifugal pawl pivoted to said friction member, a spring engaging said pawl, an adjusting screw engaging said spring, a longitudinally movable sleeve splined upon said shaft, the driving member of said friction clutch mounted upon said sleeve, and bolts securing said driving member to said sleeve, said bolt heads being adapted to be engaged by said pawl, substantially as described.

In testimony whereof I affix my signature in presence of two witnesses.

GEORGE H. GERE.

Witnesses:
LUTHER V. MOULTON,
LEWIS E. FLANDERS.